(12) United States Patent
Para

(10) Patent No.: US 11,523,603 B2
(45) Date of Patent: Dec. 13, 2022

(54) ANIMAL LIVE TRAP ASSEMBLY

(71) Applicant: Elmer Para, Daly City, CA (US)

(72) Inventor: Elmer Para, Daly City, CA (US)

( * ) Notice: Subject to any disclaimer, the term of this patent is extended or adjusted under 35 U.S.C. 154(b) by 341 days.

(21) Appl. No.: 16/880,509

(22) Filed: May 21, 2020

(65) Prior Publication Data

US 2021/0360911 A1 Nov. 25, 2021

(51) Int. Cl.
| | | |
|---|---|---|
| *A01M 23/18* | (2006.01) | |
| *A01M 23/16* | (2006.01) | |
| *A01M 23/08* | (2006.01) | |
| *A01M 23/04* | (2006.01) | |

(52) U.S. Cl.
CPC ............ *A01M 23/18* (2013.01); *A01M 23/08* (2013.01); *A01M 23/16* (2013.01); *A01M 23/04* (2013.01)

(58) Field of Classification Search
CPC ...... A01M 23/18; A01M 23/20; A01M 23/16; A01M 23/02; A01M 23/08
USPC ........ 43/60, 61, 64, 65, 67; 16/110.1, 114.1, 16/406, 422, 423, 425
See application file for complete search history.

(56) References Cited

U.S. PATENT DOCUMENTS

| | | | | |
|---|---|---|---|---|
| 544,100 A * | 8/1895 | Hurst | .................... | A01M 21/00 43/65 |
| 812,472 A * | 2/1906 | Alsobrook | ............ | A01M 23/18 43/61 |
| 1,222,406 A * | 4/1917 | Jakab | .................... | A01M 23/18 43/61 |
| 1,297,893 A * | 3/1919 | Nash | ..................... | A01M 23/18 43/61 |
| 1,335,882 A * | 4/1920 | Drag | ..................... | A01M 23/18 43/69 |
| 1,366,282 A * | 1/1921 | Ropp | .................... | A01M 23/00 43/61 |
| 1,379,685 A * | 5/1921 | Haege | .................. | A01M 23/00 43/64 |
| 1,486,663 A * | 3/1924 | Hills | ..................... | A01M 23/04 43/67 |
| 1,750,075 A * | 3/1930 | Waterman | ............. | A01M 23/18 43/69 |
| 1,765,975 A * | 6/1930 | Haege | .................. | A01M 23/20 43/67 |

(Continued)

FOREIGN PATENT DOCUMENTS

| | | | | |
|---|---|---|---|---|
| DE | 202016004310 U1 * | 10/2016 | | |
| JP | 2014217350 A * | 11/2014 | ............ | A01M 23/20 |

(Continued)

*Primary Examiner* — Darren W Ark

(57) ABSTRACT

An animal live trap assembly includes a housing that has an entry way extending therein. The housing is positionable in an area known to be occupied by small animals such that the entry way is accessible to the small animals. A door is hingedly coupled to the housing and the door is positionable between an open position or a closed position for alternatively opening or closing the entry way. A plate is hingedly positioned within the housing and the small animal stands on the plate when the small animal enters the housing. A release is movably coupled to the door for retaining the door in the open position. The release is urged into an unlocking position when the small animal stands on the plate thereby facilitating the door to be positioned in the closed position to trap the small animal in the housing.

12 Claims, 5 Drawing Sheets

(56) References Cited

U.S. PATENT DOCUMENTS

| | | | | |
|---|---|---|---|---|
| 2,016,049 A * | 10/1935 | Pritchett | A01M 23/18 | 43/61 |
| 2,059,954 A * | 11/1936 | McDonald | A01M 23/18 | 43/61 |
| 2,387,328 A * | 10/1945 | Horowitz | A01M 23/20 | 43/99 |
| 2,469,454 A * | 5/1949 | Crumrine | A01M 23/20 | 43/99 |
| 2,524,504 A * | 10/1950 | Woolworth | A01M 23/20 | 43/61 |
| 2,573,228 A * | 10/1951 | Slauth | A01M 23/18 | 43/61 |
| 2,752,722 A * | 7/1956 | Gardner | A01M 23/20 | 43/61 |
| 2,793,464 A * | 5/1957 | Bird | A01M 23/02 | 43/61 |
| 3,064,386 A * | 11/1962 | Horinek | A01M 21/00 | 43/99 |
| 3,821,861 A * | 7/1974 | Jalbert | A01K 69/08 | 43/65 |
| 3,823,504 A * | 7/1974 | Dosch | A01M 23/18 | 43/61 |
| 3,834,063 A * | 9/1974 | Souza | A01M 23/16 | 43/61 |
| 4,187,634 A * | 2/1980 | Kintz | A01M 23/20 | 43/61 |
| 4,569,149 A * | 2/1986 | Sensing | A01M 23/18 | 43/61 |
| 4,583,317 A * | 4/1986 | Beard | A01M 23/20 | 43/61 |
| 4,682,440 A * | 7/1987 | Hunter | A01M 23/20 | 43/61 |
| 4,707,943 A * | 11/1987 | Benigno | A01M 23/02 | 43/61 |
| 4,912,872 A * | 4/1990 | Wynn | A01M 23/18 | 43/60 |
| 4,926,581 A * | 5/1990 | Grivas | A01M 23/20 | 43/61 |
| 5,199,210 A * | 4/1993 | Nastas | A01M 23/20 | 43/61 |
| 5,345,710 A | 9/1994 | Bitz | | |
| 5,615,514 A * | 4/1997 | Meade, Jr. | A01M 23/20 | 43/67 |
| 6,003,265 A * | 12/1999 | Lundgren | A01M 23/24 | 43/61 |
| 6,178,686 B1 * | 1/2001 | Batman | A01M 23/18 | 43/61 |
| 6,543,179 B1 * | 4/2003 | Lee | A01M 23/20 | 43/60 |
| D503,963 S | 4/2005 | Moore, Jr. | | |
| 6,990,767 B1 | 1/2006 | Margalit | | |
| 7,503,142 B1 * | 3/2009 | Uhl | A01M 1/106 | 141/331 |
| 8,684,435 B1 * | 4/2014 | Lee | E05B 85/12 | 16/110.1 |
| 9,565,849 B1 | 2/2017 | Cassens | | |
| 2002/0066222 A1 * | 6/2002 | Gehret | A01M 23/04 | 43/61 |
| 2005/0081425 A1 * | 4/2005 | Guidry | A01M 23/04 | 43/69 |
| 2005/0097808 A1 * | 5/2005 | Vorhies | A01M 23/20 | 43/61 |
| 2008/0178516 A1 * | 7/2008 | Hall | A01M 23/20 | 43/60 |
| 2009/0107029 A1 * | 4/2009 | Ha | A01M 23/18 | 43/61 |
| 2010/0242338 A1 * | 9/2010 | Facklam | A01M 23/20 | 43/61 |
| 2012/0180378 A1 * | 7/2012 | Studer | A01M 23/16 | 43/60 |
| 2014/0020278 A1 * | 1/2014 | Smith | A01M 23/24 | 43/79 |
| 2020/0128811 A1 * | 4/2020 | Evans | A01M 23/005 | |
| 2020/0305406 A1 * | 10/2020 | Ritchie | A01M 1/145 | |

FOREIGN PATENT DOCUMENTS

| | | | |
|---|---|---|---|
| JP | 3209671 U * | 4/2017 | |
| JP | 2018078817 A * | 5/2018 | |
| JP | 3218048 U * | 9/2018 | |
| JP | 6663071 B1 * | 3/2020 | |
| JP | 6889999 B2 * | 6/2021 | |
| WO | WO-8906491 A1 * | 7/1989 | |
| WO | WO-9509531 A1 * | 4/1995 | A01M 23/20 |

* cited by examiner

ANIMAL LIVE TRAP ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to live trap devices and more particularly pertains to a new live trap device for trapping small animals without harming the small animals.

(2) Description of Related Art Including Information Disclosed Under 37 CFR 1.97 and 1.98

The prior art relates to live trap devices. The prior art discloses a live trap that includes a trap door and a trigger positioned therewith that urges the trap door into a closed position when an animal steps on the trigger. The prior art discloses a live trap that includes a bait stick, a trap door and a string extending between the bait stick and the trap door such that the trap door is urged into a closed position when the bait stick is disturbed. The prior art discloses a live trap that includes a bait tray which is in mechanical communication with a trap door that falls into a closed position when bait is removed from the bait tray by an animal. The prior art further discloses a live trap that includes a panel, a trap door and a trigger that is in mechanical communication between the panel and the trap door such that the trap door is released into a closed position when an animal walks on the panel.

BRIEF SUMMARY OF THE INVENTION

An embodiment of the disclosure meets the needs presented above by generally comprising a housing that has an entry way extending therein. The housing is positionable in an area known to be occupied by small animals such that the entry way is accessible to the small animals. A door is hingedly coupled to the housing and the door is positionable between an open position or a closed position for alternatively opening or closing the entry way. A plate is hingedly positioned within the housing and the small animal stands on the plate when the small animal enters the housing. A release is movably coupled to the door for retaining the door in the open position. The release is urged into an unlocking position when the small animal stands on the plate thereby facilitating the door to be positioned in the closed position to trap the small animal in the housing.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
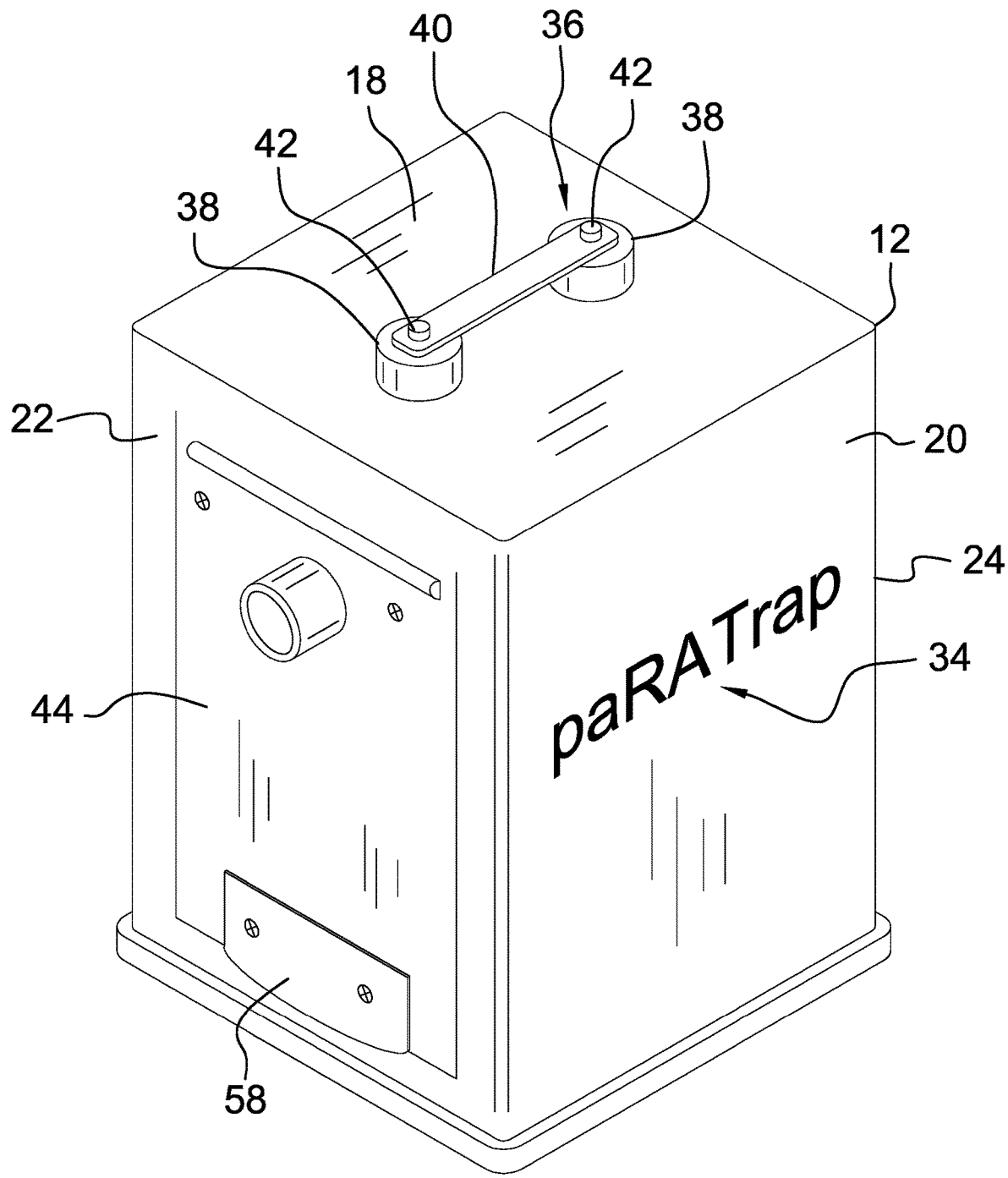
FIG. 1 is a top perspective view of an animal live trap assembly according to an embodiment of the disclosure.
Figure 2:
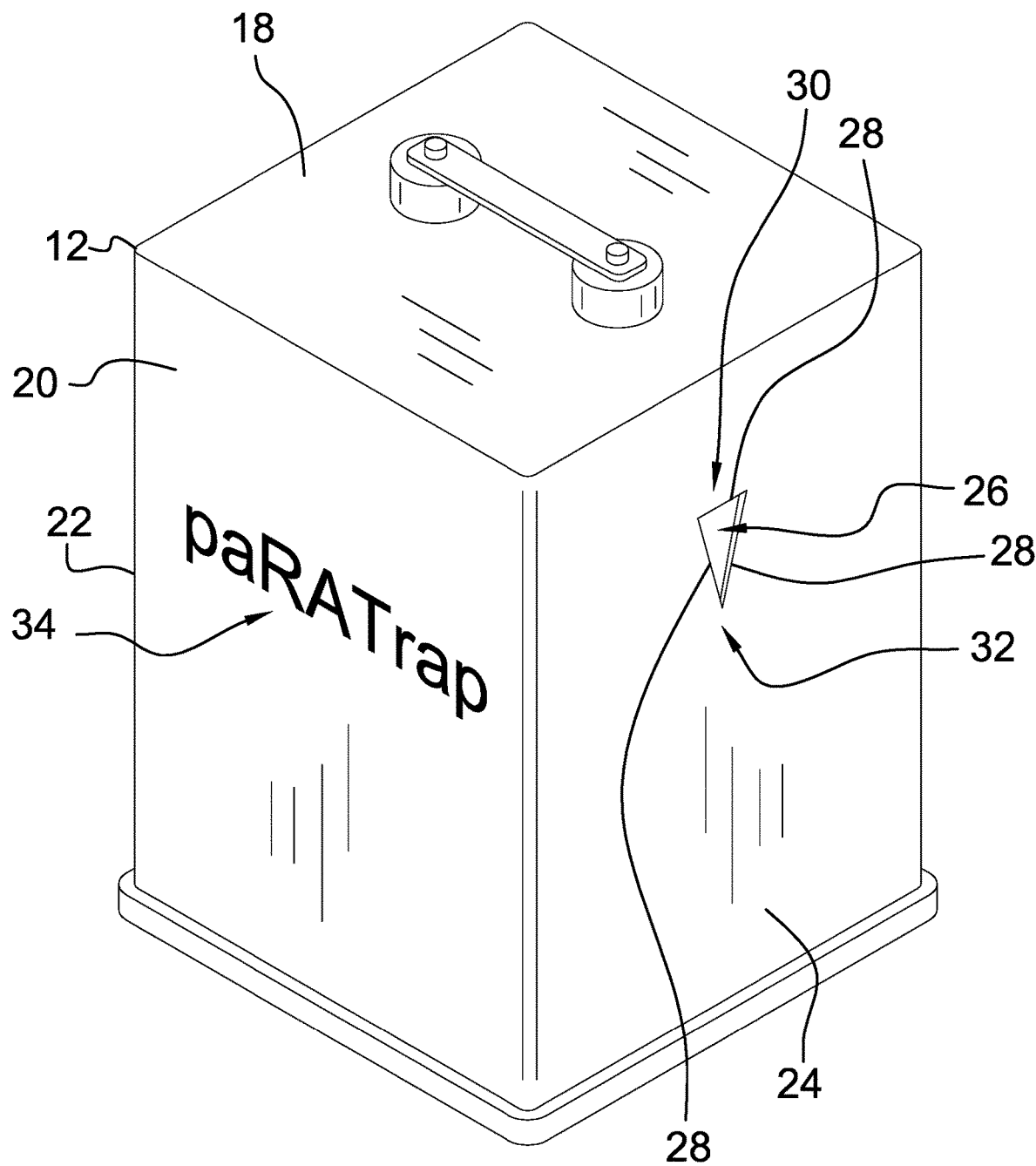
FIG. 2 is a back perspective view of an embodiment of the disclosure.
Figure 3:
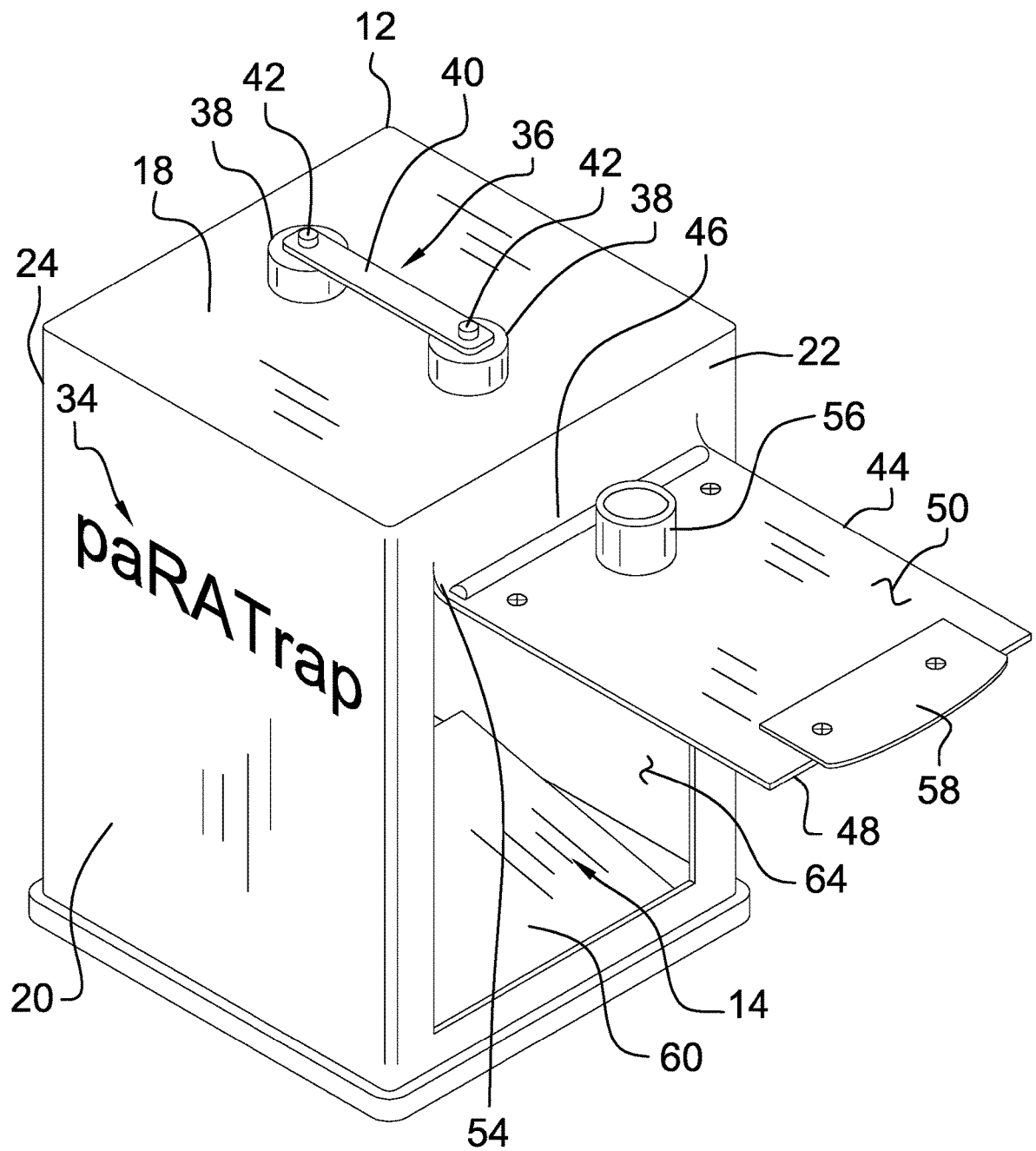
FIG. 3 is a front perspective view of an embodiment of the disclosure.
Figure 4:
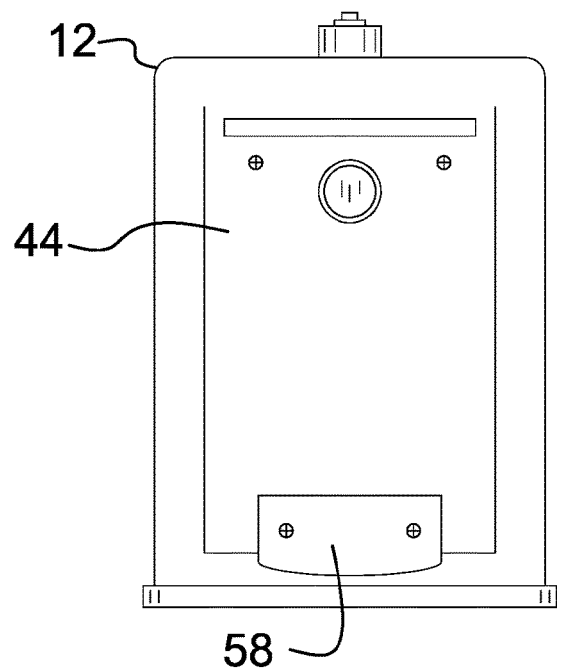
FIG. 4 is a front view of an embodiment of the disclosure.
Figure 5:
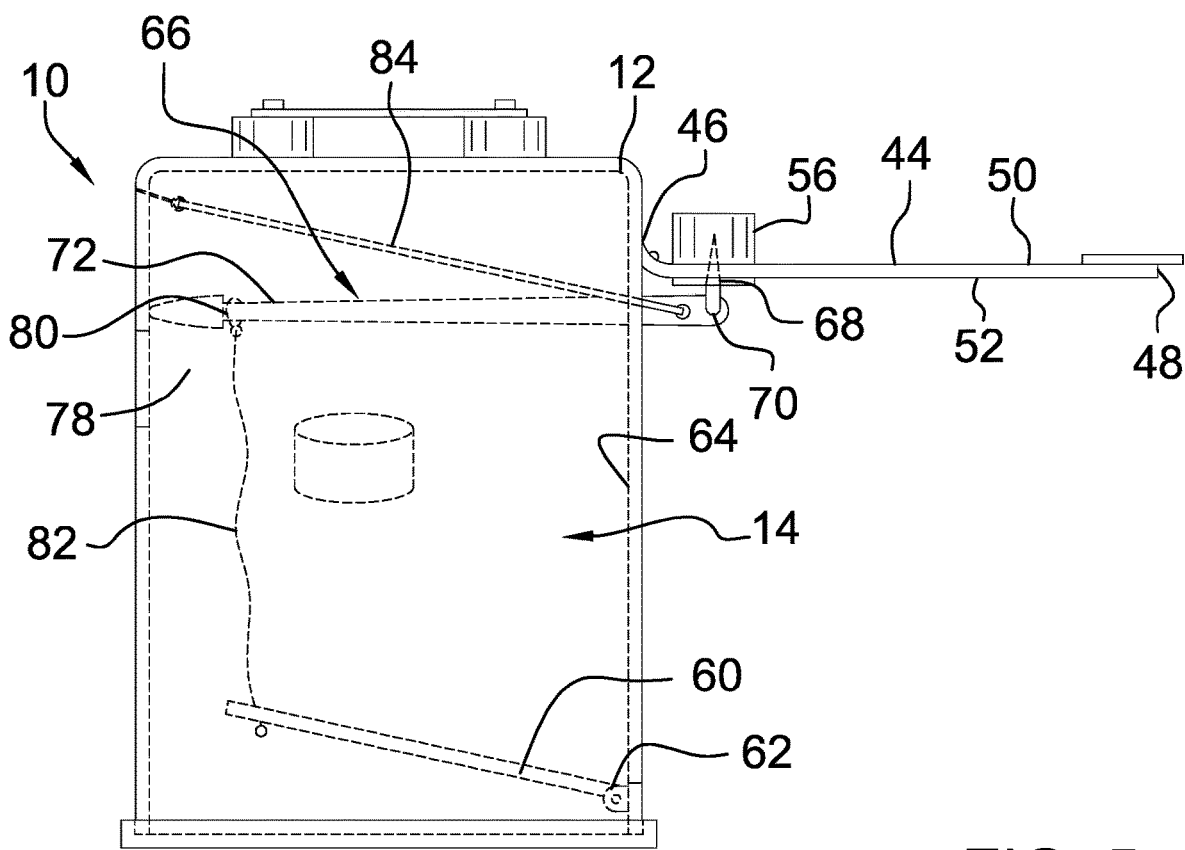
FIG. 5 is a right side phantom view of an embodiment of the disclosure.
Figure 6:
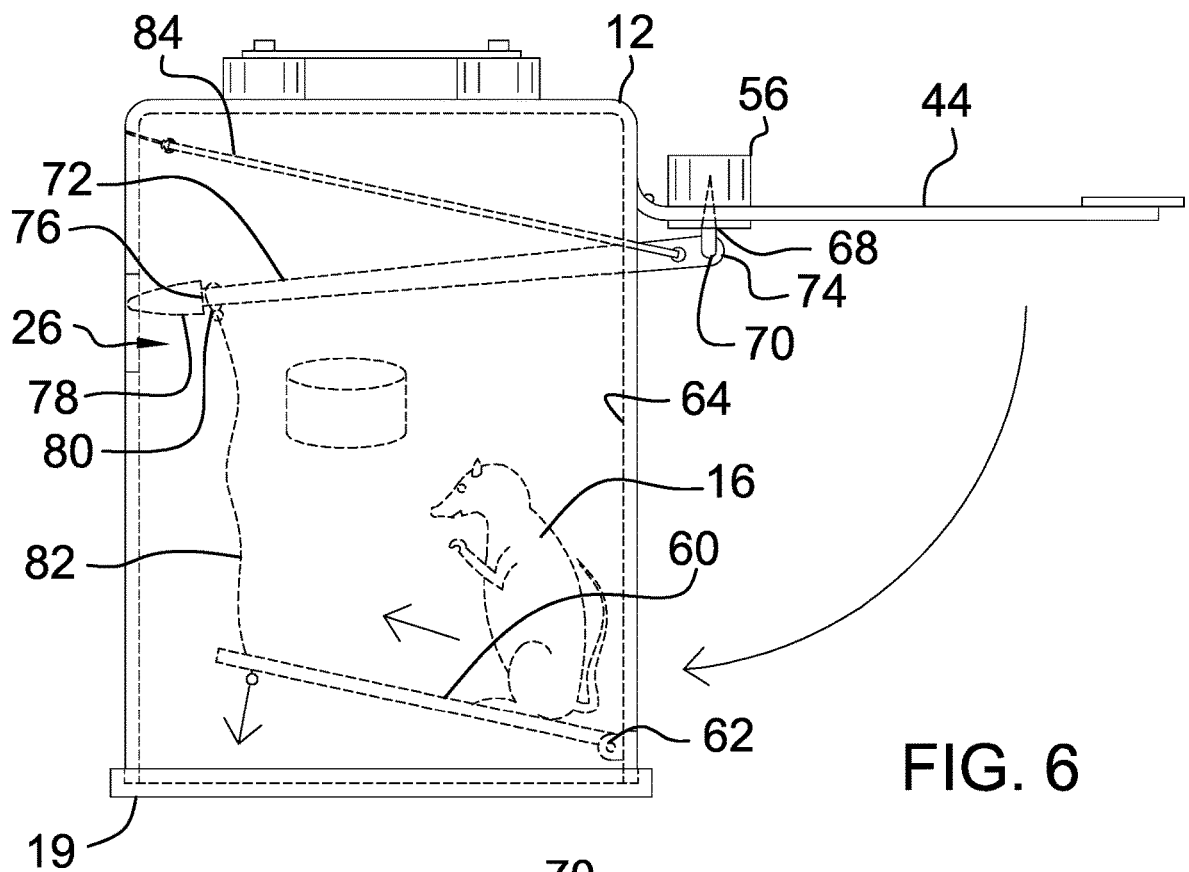
FIG. 6 is a phantom in-use view of an embodiment of the disclosure showing a small animal entering a housing.
Figure 7:
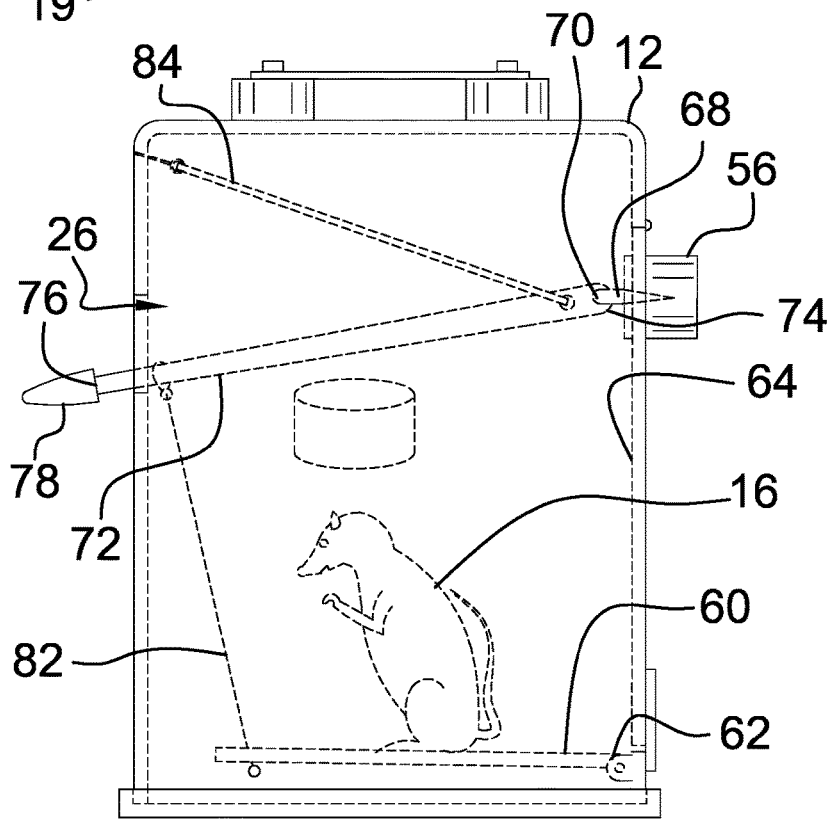
FIG. 7 is a phantom in-use view of an embodiment of the disclosure showing an animal being trapped in a housing.

With reference now to the drawings, and in particular to FIGS. 1 through 7 thereof, a new live trap device embodying the principles and concepts of an embodiment of the disclosure and generally designated by the reference numeral 10 will be described.

As best illustrated in FIGS. 1 through 7, the animal live trap assembly 10 generally comprises a housing 12 that has an entry way 14 extending therein. The housing 12 is positionable in an area known to be occupied by small animals 16, such as rats or the like, such that the entry way 14 is accessible to the small animals 16. The housing 12 has a top wall 18, a bottom wall 19 and an outer wall 20 extending therebetween, and the outer wall 20 has a front side 22 and a back side 24. The entry way 14 extends through the front side 22 and the entry way 14 extends substantially between the top wall 18 and the bottom wall 19. The housing 12 may be comprised of food grade plastic or other material that would commonly be found in a food preparation environment, such as a restaurant.

The back side 24 has an opening 26 extending therethrough and the opening 26 has a plurality of intersecting sides 28 defining a triangle. The opening 26 is oriented such that a base 30 of the triangle is directed toward the top wall 18 and a point 32 of the triangle is directed toward the bottom wall 19. Additionally, the outer wall 20 has indicia 34 printed thereon and the indicia 34 comprise a word. The word may comprise "paRATrap".

A handle 36 is coupled to the housing 12 for carrying the housing 12. The handle 36 comprises a pair of disks 38 that each lies on the top wall 18 and the disks 38 are spaced apart from each other. The handle 36 includes a strip 40 extending across each of the disks 38 such that the strip 40 is spaced from the top wall 18 for gripping. A pair of fasteners 42 is provided and each of the fasteners 42 extends through the strip 40 and a respective one of the disks 38 to engage the top wall 18.

A door 44 is provided and the door 44 is hingedly coupled to the housing 12. The door 44 is positionable between an open position or a closed position for alternatively opening 26 or closing the entry way 14. The door 44 has an upper edge 46, a lower edge 48, a first surface 50 and a second surface 52. The upper edge 46 is hingedly coupled to an upper bounding edge 54 of the entry way 14 and the first surface 50 is exposed when the door 44 is in the open position.

A cup 56 is coupled to the first surface 50 of the door 44 and the cup 56 is positioned adjacent to the upper edge 46 of the door 44. A stop 58 is coupled to and extends downwardly from the door 44 and the stop 58 abuts the housing 12 when the door 44 is closed. The stop 58 is positioned on the first surface 50 of the door 44 and the stop 58 extends beyond the lower edge 48 of the door 44. A plate 60 is hingedly positioned within the housing 12 such that the small animal 16 can stand thereon. The plate 60 has a front edge 62 and the front edge 62 is hingedly coupled to an inside surface 64 of the front side 22 of the outer wall 20 of the housing 12 having the plate 60 being spaced from the bottom wall 19 of the housing 12.

A release 66 is provided and the release 66 is movably coupled to the door 44. The release 66 is positioned in a locking position when the door 44 is positioned in the open position for retaining the door 44 in the open position. The release 66 is coupled to the plate 60 and the release 66 is urged into an unlocking position when the small animal 16 stands on the plate 60. In this way the door 44 can be positioned in the closed position to trap the small animal 16 in the housing 12.

The release 66 comprises a finger 68 that is coupled to the cup 56 and extends through the door 44 and the finger 68 has a distal end 70 with respect to the door 44. The release 66 includes a rod 72 that has a first end 74 and a second end 76, and the first end 74 is pivotally coupled to the distal end 70 of the finger 68. The release 66 includes a head 78 that is coupled to the second end 76 of the rod 72. The head 78 tapers to a point and the head 78 abuts the back side 24 of the outer wall 20 of the housing 12 when the door 44 is positioned in the open position. Additionally, the head 78 is positioned above the opening 26 in the back side 24 of the outer wall 20 when the door 44 is positioned in the open position.

The release 66 includes a ring 80 that is slidably positioned around the rod 72 and a string 82 that is coupled between the ring 80 and the plate 60 such that the rod 72 is in mechanical communication with the plate 60. The string 82 urges the rod 72 downwardly along the back side 24 of the outer wall 20 when the small animal 16 stands on the plate 60 thereby aligning the head 78 with the opening 26 in the back side 24 of the outer wall 20. In this way the rod 72 can pass through the opening 26 and the door 44 is positionable in the closed position when the rod 72 passes through the opening 26. Additionally, the ring 80 slides along the rod 72 when the rod 72 passes through the opening 26.

The release 66 includes biasing member 84 that is coupled between the back side 24 of the outer wall 20 of the housing 12 and the rod 72. The biasing member 84 biases the door 44 into the closed position when the rod 72 passes through the opening 26. The biasing member 84 may comprise an elastomeric member, a spring or other similar type of biasing member 84.

In use, the housing 12 is positioned in a desired location and the door 44 is positioned in the open position. The rod 72 is positioned to abut the outer wall 20 of the housing 12 at a point located above the opening 26 in the back side 24 of the outer wall 20 of the housing 12. Bait is positioned in the housing 12 to lure the small animal 16 into the housing 12. The small animal 16 walks on the plate 60 when the small animal 16 enters the housing 12. In this way the weight of the animal urges the plate 60 downwardly thereby facilitating the rod 72 to be aligned with and subsequently pass through said opening 26. Thus, the door 44 is biased into the closed position for trapping the small animal 16 without harming the small animal 16. The housing 12 can be transported to a suitable location for releasing the small animal 16, and the process of trapping a small animal 16 can be endlessly repeated.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An animal live trap assembly for capturing live animals without harming the animals, said assembly comprising:
   a housing having an entry way extending therein, said housing being positionable in an area known to be occupied by small animals, wherein said entry way is configured to be accessible to the small animals, wherein said housing has a top wall, a bottom wall and an outer wall extending therebetween, said outer wall having a front side and a back side, said entry way extending through said front side, said entry way extending substantially between said top wall and said bottom wall, said back side having an opening extending therethrough, said opening having a plurality of intersecting sides defining a triangle, said opening being oriented such that a base of said triangle is directed toward said top wall and a point of said triangle is directed toward said bottom wall, said outer wall having indicia being printed thereon, said indicia comprising a word;
- a handle being coupled to said housing for carrying said housing;
- a door being hingedly coupled to said housing, said door being positionable between an open position or a closed position for alternatively opening or closing said entry way;
- a plate being hingedly positioned within said housing, wherein said plate is configured to have one of the small animals stand thereon; and
- a release being movably coupled to said door, said release being positioned in a locking position when said door is positioned in said open position for retaining said door in said open position, said release being coupled to said plate, said release being urged into an unlocking position when the one of the small animals stands on said plate thereby facilitating said door to be positioned in said closed position, wherein said release is configured to trap the one of the small animals in said housing.

2. The assembly according to claim 1, wherein said handle comprises:
- a pair of disks, each of said disks lying on said top wall, said disks being spaced apart from each other;
- a strip extending across each of said disks such that said strip is spaced from said top wall, wherein said strip is configured to be gripped; and
- a pair of fasteners, each of said fasteners extending through said strip and a respective one of said disks to engage said top wall.

3. The assembly according to claim 1, wherein said door has an upper edge, a lower edge, a first surface and a second surface, said upper edge being hingedly coupled to an upper bounding edge of said entry way, said first surface being exposed when said door is in said open position.

4. The assembly according to claim 1, further comprising a cup being coupled to said first surface of said door, said cup being positioned adjacent to said upper edge of said door.

5. The assembly according to claim 1, further comprising a stop being coupled to and extending downwardly from said door, said stop abutting said housing when said door is closed, said stop being positioned on said first surface of said door, said stop extending beyond said lower edge of said door.

6. The assembly according to claim 1, wherein said plate has a front edge, said front edge being hingedly coupled to an inside surface of said front side of said outer wall of said housing, said plate being spaced from said bottom wall of said housing.

7. The assembly according to claim 1, wherein said release comprises a finger being coupled to said cup and extending through said door, said finger having a distal end with respect to said door.

8. The assembly according to claim 7, wherein said release includes a rod having a first end and a second end, said first end being pivotally coupled to said distal end of said finger.

9. The assembly according to claim 8, wherein said release includes a head being coupled to said second end of said rod, said head tapering to a point, said head abutting said back side of said outer wall of said housing when said release is positioned in said locking position and when said door is positioned in said open position, said head being positioned above said opening in said back side of said outer wall when said release is positioned in said locking position and when said door is positioned in said open position.

10. The assembly according to claim 8, wherein said release includes a biasing member being coupled between said back side of said outer wall of said housing and said rod, said biasing member biasing said door into said closed position when said rod passes through said opening.

11. The assembly according to claim 9, wherein said release includes a string being coupled between said rod and said plate such that said rod is in mechanical communication with said plate, said string urging said rod downwardly along said back side of said outer wall when the one of the small animals stands on said plate thereby aligning said head with said opening in said back side of said outer wall thereby facilitating said rod to pass through said opening, said door being positionable in said closed position when said rod passes through said opening such that the release is positioned in the unlocking position.

12. An animal live trap assembly for capturing live animals without harming the animals, said assembly comprising:
- a housing having an entry way extending therein, said housing being positionable in an area know to be occupied by small animals, wherein said entry way is configured to be accessible to the small animals, said housing having a top wall, a bottom wall and an outer wall extending therebetween, said outer wall having a front side and a back side, said entry way extending through said front side, said entry way extending substantially between said top wall and said bottom wall, said back side having an opening extending therethrough, said opening having a plurality of intersecting sides defining a triangle, said opening being oriented such that a base of said triangle is directed toward said top wall and a point of said triangle is directed toward said bottom wall, said outer wall having indicia being printed thereon, said indicia comprising a word;
- a handle being coupled to said housing for carrying said housing, said handle comprising:
  - a pair of disks, each of said disks lying on said top wall, said disks being spaced apart from each other;
  - a strip extending across each of said disks such that said strip is spaced from said top wall, wherein said strip is configured to be gripped; and
  - a pair of fasteners, each of said fasteners extending through said strip and a respective one of said disks to engage said top wall;
- a door being hingedly coupled to said housing, said door being positionable between an open position or a closed position for alternatively opening or closing said entry way, said door having an upper edge, a lower edge, a first surface and a second surface, said upper edge being hingedly coupled to an upper bounding edge of said entry way, said first surface being exposed when said door is in said open position;
- a cup being coupled to said first surface of said door, said cup being positioned adjacent to said upper edge of said door;
- a stop being coupled to and extending downwardly from said door, said stop abutting said housing when said door is closed, said stop being positioned on said first surface of said door, said stop extending beyond said lower edge of said door;
- a plate being hingedly positioned within said housing, wherein said plate is configured to have one of the small animals stand thereon, said plate having a front edge, said front edge being hingedly coupled to an inside surface of said front side of said outer wall of said housing, said plate being spaced from said bottom wall of said housing; and a release being movably coupled to said door, said release being positioned in a locking position when said door is positioned in said open position for retaining said door in said open position, said release being coupled to said plate, said release being urged into an unlocking position when the one of the small animals stands on said plate thereby facilitating said door to be positioned in said closed position, wherein said release is configured to trap the one of the small animals in said housing, said release comprising:

a finger being coupled to said cup and extending through said door, said finger having a distal end with respect to said door;

a rod having a first end and a second end, said first end being pivotally coupled to said distal end of said finger;

a head being coupled to said second end of said rod, said head tapering to a point, said head abutting said back side of said outer wall of said housing when said release is positioned in said locking position and when said door is positioned in said open position, said head being positioned above said opening in said back side of said outer wall when said release is positioned in said locking position and when said door is positioned in said open position;

a string being coupled between said rod and said plate such that said rod is in mechanical communication with said plate, said string urging said rod downwardly along said back side of said outer wall when the one of the small animals stands on said plate thereby aligning said head with said opening in said back side of said outer wall thereby facilitating said rod to pass through said opening, said door being positionable in said closed position when said rod passes through said opening; and a biasing member being coupled between said back side of said outer wall of said housing and said rod, said biasing member biasing said door into said closed position when said rod passes through said opening such that the release is positioned in the unlocking position.

* * * * *